W. KNAPP.
PARKING LIGHT.
APPLICATION FILED SEPT. 4, 1920.
1,401,988.
Patented Jan. 3, 1922.
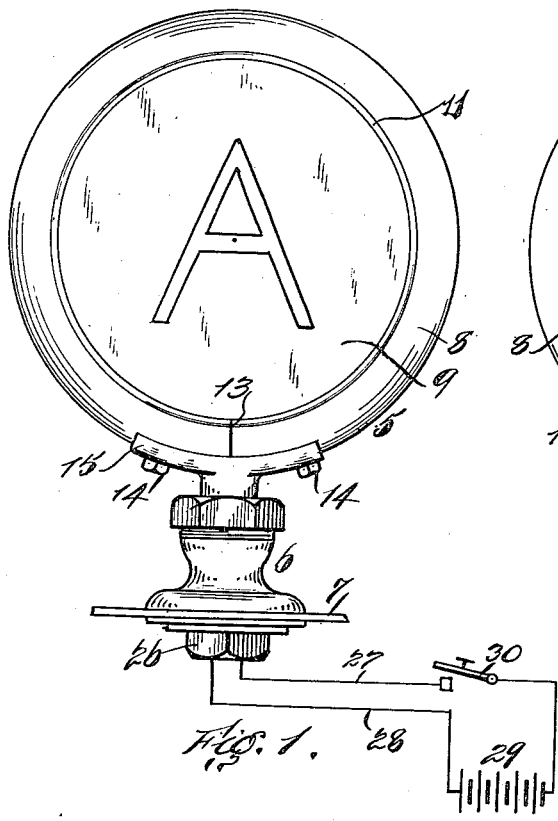
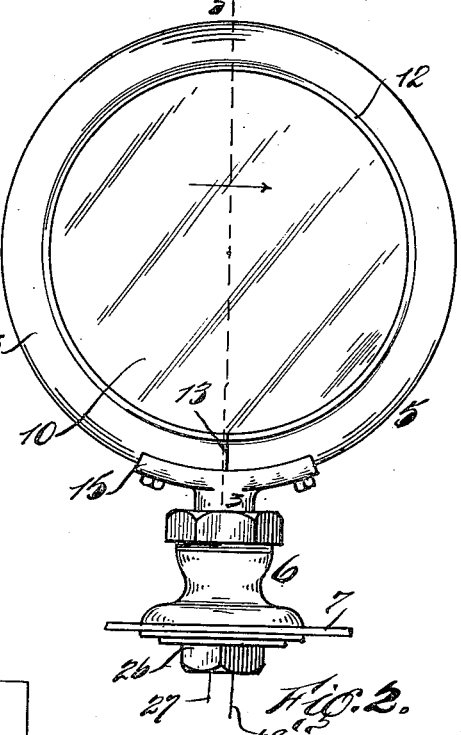
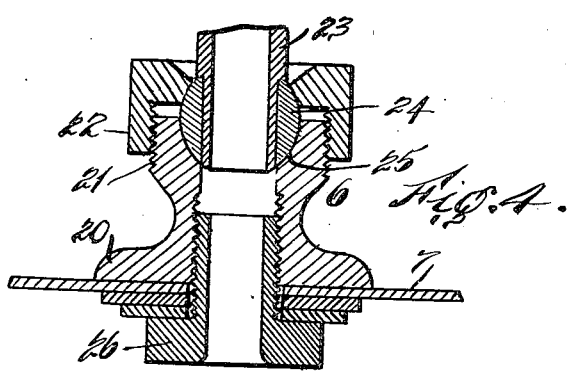
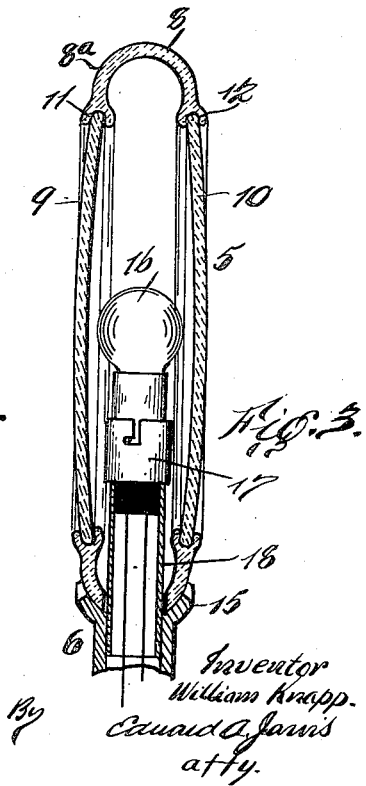
Inventor
William Knapp.
By Edward A. Jarvis
atty.

UNITED STATES PATENT OFFICE.

WILLIAM KNAPP, OF BAYONNE, NEW JERSEY.

PARKING LIGHT.

1,401,988.  Specification of Letters Patent.  Patented Jan. 3, 1922.

Application filed September 4, 1920. Serial No. 408,165.

*To all whom it may concern:*

Be it known that I, WILLIAM KNAPP, a citizen of Germany, residing at Bayonne, county of Hudson, State of New Jersey, have invented certain new and useful Improvements in Parking Lights, of which the following is a full, clear, and exact description.

This invention relates to improvements in parking lights for motor vehicles, having a battery, to be used instead of the usual headlights, tail-light and dash-light while parked, thereby saving, while the vehicle is parked, considerable battery energy.

I will now proceed to describe my device in detail, reference being had to the accompanying drawing, wherein:—

Figs. 1 and 2 are respectively front and rear views of the device;

Fig. 3 is an enlarged section on line 3—3 in Fig. 2; and

Fig. 4 is an enlarged fragmentary detail view of the support for the casing of the device.

My improved device consists of a casing portion 5 and a support 6 therefor arranged, in this instance, for attachment to a mudguard, indicated by 7. The casing 5 is made up of a circular frame or rim 8 made of some transparent material such as fire-proof celluloid, or other material, through which light will pass, which will be preferably colored red, or partly red and partly some other color. The frame 8 holds a transparent front lens 9, either clear or frosted, and a rear mirror 10, the frame 8 being equipped with annular channels 11 and 12 at the edges thereof to receive the peripheral edges of the lens 9 and mirror 10 (see Fig. 3). The frame 8 will be preferably split, as at 13, in order to facilitate the mounting of the lens 9 and mirror 10. The frame will be held in compressed condition in contact with the edges of the lens 9 and mirror 10 by bolts, in this instance, indicated by 14, said bolts passing through the saddle 15 of the support 6. Between the lens 9 and mirror 10, I place an electric lamp bulb 16, of suitable power, said bulb being supported by a socket 17, carried by a tubular post 18, carried by the support 6. As can be seen, the support 6 is made up of a base-member 20, having a threaded portion 21 to be engaged by a lock-nut 22. The other member of the support consists of a post 23, carried by the saddle 15, which, at its lower end, is provided with a ball 24 to fit the socket 25 in the base-portion 20. This ball and socket connection is provided in order that the mirror or casing 5 can be adjusted to any angle desired by the operator of the motor vehicle. The base 20 may be secured to the mudguard 7 by means of a tubular nipple 26. As the post 23, nipple 26 and base 20 are hollow, the circuit wires 27 and 28, which connect the bulb 16 to a battery, indicated by 29, may be threaded therethrough. A switch 30 will serve to close the circuit for the bulb.

I do not limit myself to this form of support, as any suitable support may be used.

If desirable, a monogram, indicated by A, Fig. 1, may be affixed or applied to the front lens 9.

While a vehicle is parked, the switch 30 will be closed, thereby producing a light in the casing 5, which will illuminate the white lens 9 and colored transparent frame 8, the result being that a white light will show from the front of the vehicle, surrounded by a red circle of light and a red circle of light will show from the rear. If desirable, the front portion 8ª of the frame 8 can be rendered opaque or colored to suit the taste, green for instance, or it can be made to show a white circle. Under ordinary circumstances, the device will be attached to the front left mudguard of a vehicle, but it might be attached to a windshield or at some other point.

Having described my invention, what I claim and desire to secure by Letters Patent is:—

1. In a parking lamp, a casing consisting of a rim member arranged for the passage of light through the wall thereof, a translucent lens at one side of the casing, a mirror at the opposite side of the casing, and a lighting medium, to illuminate the translucent lens and rim of the casing, located between said lens and mirror.

2. In a parking lamp, a casing consisting of a rim member, arranged for the passage of light through the wall thereof, a translucent lens at one side of the casing, a mirror at the opposite side of the casing, a lighting medium to illuminate the translucent lens and rim of the casing, located between said lens and mirror, and means to adjustably secure the casing to a motor vehicle.

3. In a parking lamp, a casing consisting of a transparent member open at each end and provided with annular channels surrounding said openings, a mirror located in the channel surrounding one of the openings, a white lens located in the channel surrounding the other of said openings, and a light producing medium located between said white lens and mirror.

Signed at New York City, N. Y., this 1st day of September, 1920.

WILLIAM KNAPP.

Witnesses:
EDWARD A. JARVIS,
RHEA ROSENBERG.